United States Patent
Suzuki et al.

(10) Patent No.: US 6,259,178 B1
(45) Date of Patent: Jul. 10, 2001

(54) INITIAL ADJUSTMENT CIRCUIT AND INITIAL ADJUSTMENT METHOD OF MAGNETIC BEARING APPARATUS

(75) Inventors: Nobuyuki Suzuki; Takayoshi Ozaki, both of Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/360,693

(22) Filed: Jul. 26, 1999

(30) Foreign Application Priority Data

Aug. 18, 1998 (JP) .................................................. 10-231563

(51) Int. Cl.⁷ ......................................................... J02K 7/09
(52) U.S. Cl. .............................................................. 310/90.5
(58) Field of Search ............................................. 310/90.5

(56) References Cited

U.S. PATENT DOCUMENTS

| | | | |
|---|---|---|---|
| 4,643,592 | * | 2/1987 | Lewis et al. ........................... 384/100 |
| 5,093,754 | * | 3/1992 | Kawashima ........................... 310/90.5 |
| 5,347,190 | * | 9/1994 | Lewis et al. ........................... 310/90.5 |
| 5,350,283 | * | 9/1994 | Nakazeki et al. ..................... 310/90.5 |
| 5,453,684 | * | 9/1995 | Nakayama ............................. 318/632 |
| 5,471,106 | * | 11/1995 | Curtis et al. .......................... 310/90.5 |
| 5,703,424 | * | 12/1997 | Dorman ................................. 310/90.5 |

* cited by examiner

Primary Examiner—Karl Tamai
(74) Attorney, Agent, or Firm—McDermott, Will & Emery

(57) ABSTRACT

A main adjusting circuit obtains an intermediate value of maximum and minimum values of an output from a position sensor when a rotational shaft is brought into contact with a ball bearing for protection by reduction in a proportional constant K of a proportional circuit. An offset value corresponding to a difference between 0V and the intermediate value of the vibration is added to or subtracted from the output from the sensor for initial adjustment.

9 Claims, 3 Drawing Sheets

INITIAL ADJUSTMENT CIRCUIT AND INITIAL ADJUSTMENT METHOD OF MAGNETIC BEARING APPARATUS

BACKGROUND OF THE INVENTION

1. Field of the Invention

The present invention relates to initial adjustment circuits and initial adjustment methods of a magnetic bearing apparatus. More specifically, the present invention relates to an initial adjustment circuit and an initial adjustment method used for initially adjusting offset amounts and gains of a plurality of position sensors in a magnetic bearing apparatus used for a vacuum pump for obtaining a high vacuum or the like for magnetically supporting a rotational shaft of a spindle for a turbo molecular pump.

2. Description of the Background Art

FIG. 4 is a view showing a structure of a conventional magnetic bearing spindle. Referring to FIG. 4, a magnetic bearing spindle for turbo molecular pump 1 has a rotational shaft 3 provided in a case 2. Rotational shaft 3 is supported in a non-contact manner in thrust and radial directions by a thrust magnetic bearing 4 and radial magnetic bearings 5 and 6 respectively provided above and below magnetic bearing 4, and rotationally driven by a driving motor 7. A position in a radial direction of rotational shaft 3 is detected by radial position sensors 8 and 9, and a position in a thrust direction is detected by a thrust position sensor 10. Further, ball bearings for protection 11 and 12, which support rotational shaft 3 in case of abnormality of radial magnetic bearings 5 and 6, are arranged above and below rotational shaft 3.

Detection outputs from position sensors 8, 9 and 10 are applied to a controller 20 which is externally provided. Controller 20 controls magnetic bearings 4, 5 and 6 under control of an external system controller 30. As motor 7 is driven, rotational shaft 3 of magnetic bearing spindle 1 rotates.

In magnetic bearing spindle 1 shown in FIG. 4, when offset amounts and sensor gains of the outputs from position sensors 8, 9 and 10 are different from designed values, rotational shaft 3 is vibrated to be in contact with bearings for protection 11 and 12, whereby stable rotation is not ensured. To avoid this problem, the offset amounts and gains of position sensors 8, 9 and 10 must be precisely measured for adjustment.

SUMMARY OF THE INVENTION

Therefore, a main object of the present invention is to provide an initial adjustment circuit and an initial adjustment method capable of automatically adjusting a drift and a gain of each position sensor.

In short, the present invention is an initial adjustment circuit for a magnetic bearing apparatus provided with a magnetic bearing body including a plurality of position sensors for detecting a position of a rotator, a magnetic bearing arranged corresponding to respective position sensor for supporting an axis of a rotator magnetically in a non-contact manner, and a protection bearing for supporting the rotator in case of abnormality of the magnetic bearing. The magnetic bearing is controlled by a control circuit in accordance with detection signals from the plurality of position sensors. The rotator is vibrated to be in contact with the protection bearing by reduction in the gain of the control circuit during initial operation, and a position where the rotator is supported by the corresponding magnetic bearing is adjusted in accordance with outputs from the plurality of position sensors at the time.

Therefore, according to the present invention, the output from the position sensor is detected when the gain of the control system is reduced and the rotator is brought into contact with the protection bearing, and the control system is initially adjusted to obtain a gain corresponding to a position where contact between the rotator and the protection bearing are avoided. Thus, stable rotation is ensured.

In a more preferred embodiment of the present invention, the control circuit reduces the gain to obtain an intermediate value of the vibration by using maximum and minimum values of each sensor output when the offset value of the output from each of the plurality of position sensors is maximum. Then, a difference between the intermediate value of the vibration and 0V of the output from each of the plurality of sensors is obtained, so that the difference is added to or subtracted from the output from the corresponding position sensor.

In a more preferred embodiment, the above mentioned addition or subtraction by the control circuit is performed several times.

In a more preferred embodiment, the magnetic bearing body includes a thrust magnetic bearing for supporting the rotator in the thrust direction and a radial magnetic bearing for magnetically supporting the rotator in the radial direction.

In a more preferred embodiment, the plurality of position sensors include thrust and radial position sensors for respectively detecting displacements of the rotator in the thrust and radial directions. The protection bearings are arranged on one end and the other end sides of the rotator, and the rotator is provided with a motor.

According to another aspect of the present invention, an initial adjustment method of a magnetic bearing apparatus is provided, where the magnetic bearing apparatus is provided with a magnetic bearing body including a plurality of sensors for detecting a position of a rotator, a magnetic bearing arranged corresponding to each of the plurality of sensors for supporting an axis of a rotator in a magnetically non-contact manner, and a protection bearing for supporting the rotator in case of abnormality of the magnetic bearing. In the method, the magnetic bearing is controlled in accordance with detection signals from the plurality of position sensors. Further, the rotator is vibrated to be in contact with the protection bearing by reduction in the gain of the control system during initial operation, and a position where the rotator is supported by the corresponding magnetic bearing is adjusted in accordance with the outputs from the plurality of position sensors at the time.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
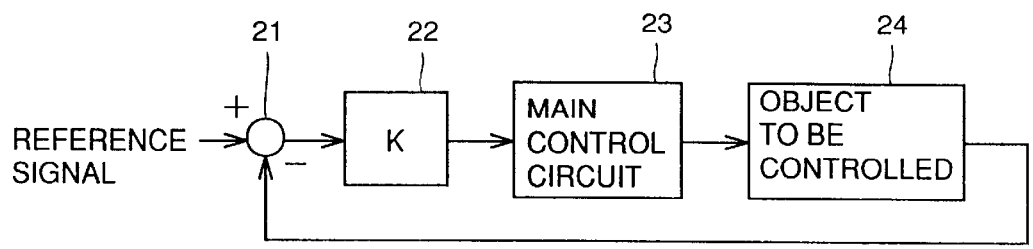
FIG. 1 is a schematic block diagram showing an embodiment of the present invention.
Figure 4:
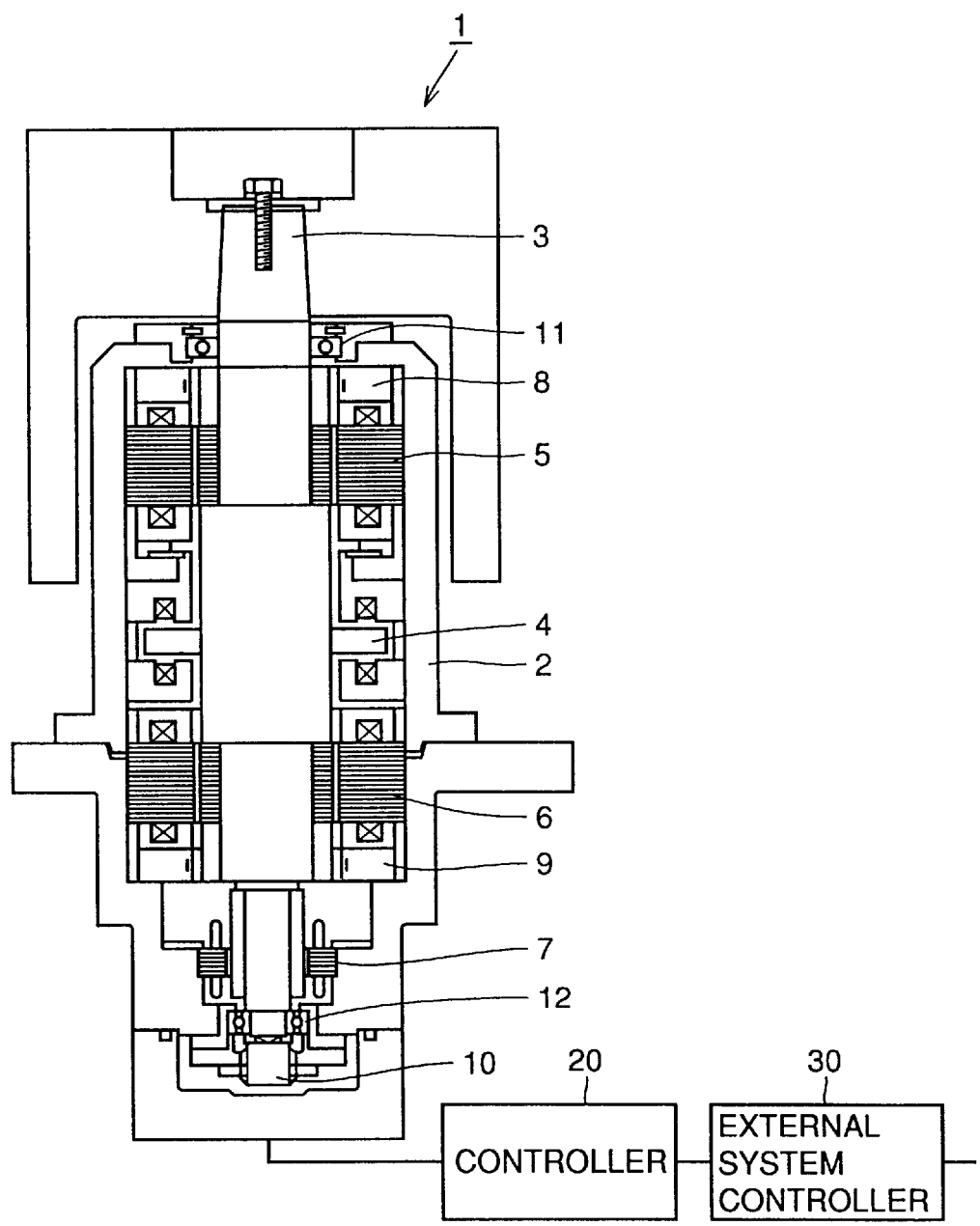
FIG. 4 is a view showing a structure of a conventional magnetic bearing spindle.

FIG. 1 is a block diagram showing an embodiment of the present invention. Although only one control loop is shown in FIG. 1, such control loop is provided corresponding to each control axis. A reference signal and a feedback signal from an object to be controlled 24 are applied to a subtractor 21. Object to be controlled 24 corresponds to magnetic bearing spindle 1 shown in FIG. 4. Subtractor 21 subtracts the feedback signal from the reference signal. The outputs from position sensors 8, 9 and 10 shown in FIG. 4 are used as the feedback signal from object to be controlled 24. An output from subtractor 21 is applied to a proportional circuit 22, multiplied by a proportional constant K, and applied to a main control circuit 23. Main control circuit 23 includes a phase correction circuit and a driving circuit for driving magnetic bearings 4, 5 and 6. Object to be controlled 24 is driven by main control circuit 23.

Figure 3:
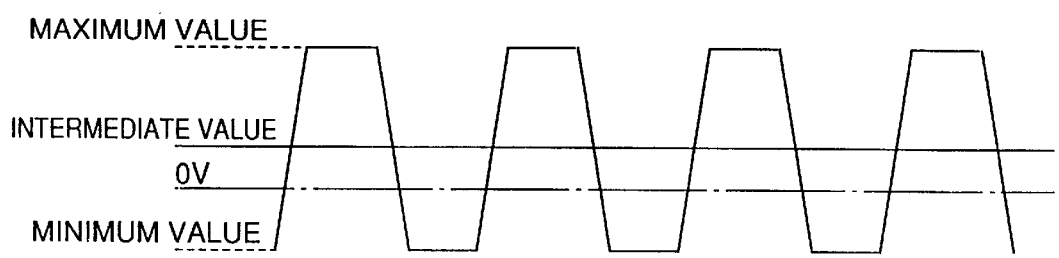
FIG. 3 is a timing chart showing in detail the operation of the embodiment of the present invention.
Figure 2:
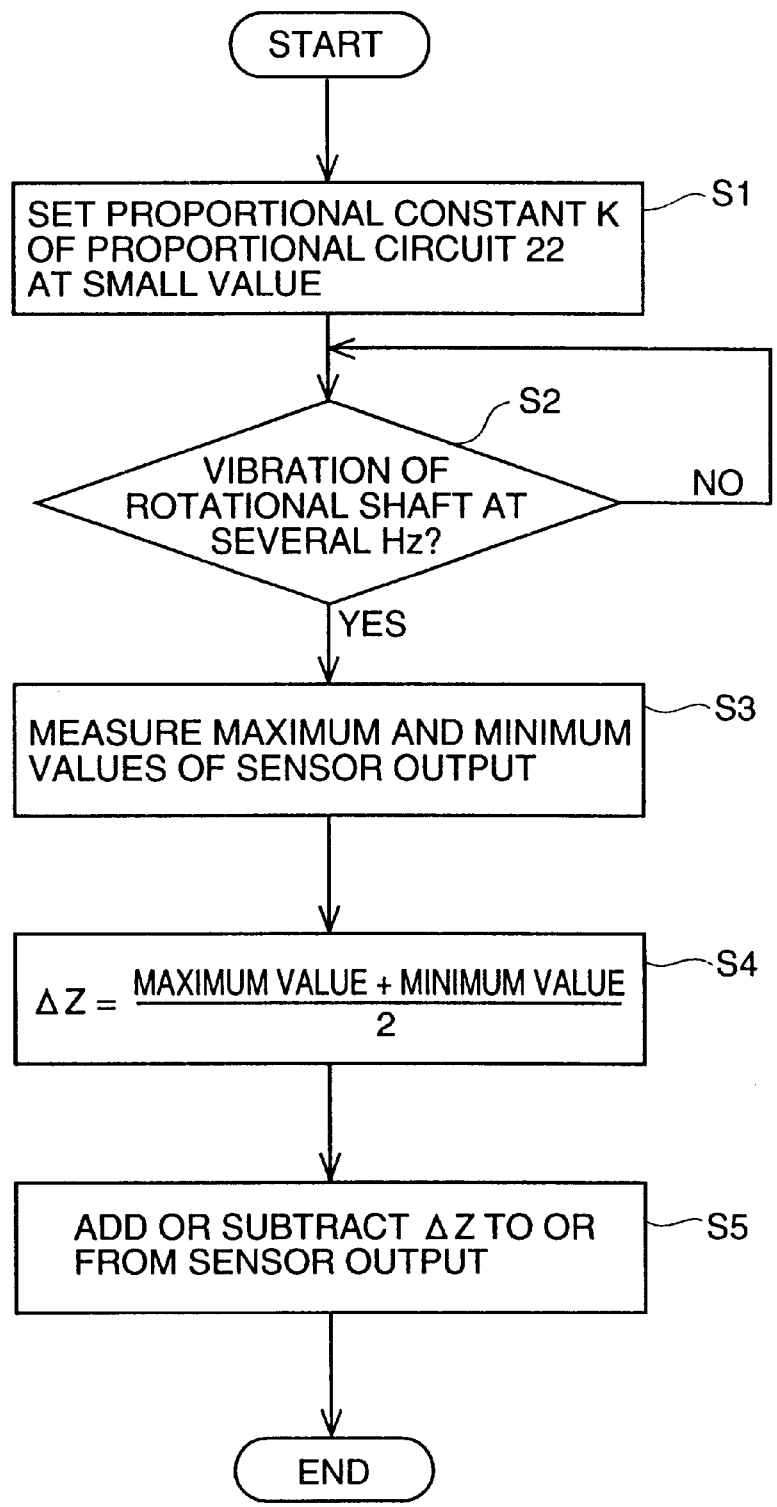
FIG. 2 is a flow chart showing an operation of the embodiment of the present invention.

Referring now to FIGS. 1 to 3, the operation of the embodiment according to the present invention will now be described in detail. In a step (abbreviated as S in the drawing) S1, the proportional constant of proportional circuit 22 is set at a small value. In a step S2, rotational shaft 3 is brought into contact with ball bearings for protection 11 and 12 by a circuit (not shown), and determination is made as to whether rotational shaft 3 is vibrated at a frequency of several Hz. If the vibration is detected, maximum and minimum values of the output from the sensor in a step S3 is measured. In a step S4, the measured maximum and minimum values are added and divided by two, so that $\Delta Z$ is obtained. In a step S5, $\Delta Z$ is added to or subtracted from the output from the sensor.

Further, the gain of the sensor is adjusted to provide a prescribed amplitude. When the sensor has a non-linear characteristic, adjustment of the gain changes the offset amount. However, by repeating the above described adjustment, the gain and the offset amount converge. Thus, the gain and the offset amount are repeatedly adjusted to enable rotational shaft 3 to be kept at the center of ball bearings for protection 11 and 12 in a magnetically floating manner. Therefore, stable rotation of rotational shaft 3 is ensured.

As described above, according to the present embodiment, rotational shaft 3 is vibrated to be in contact with ball bearings for protection 11 and 12 by reduction in the gain of the control system during initial operation, and the intermediate value of the vibration is determined by using the maximum and minimum values of the output from the position sensor at the time. Then, difference $\Delta Z$ with respect to the current offset amount, 0V, is added to or subtracted from the output from the sensor, so that rotational shaft 3 is kept at the center of ball bearings for protection 11 and 12 in the magnetically floating manner. Therefore, stable rotation of rotational shaft 3 is ensured.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An initial adjustment circuit of a magnetic bearing apparatus, comprising:

a magnetic bearing body including a plurality of position sensors detecting a position of a rotator, a magnetic bearing provided corresponding to each of said plurality of position sensors for supporting an axis of said rotator in a magnetically non-contact manner, and a protection bearing for supporting said rotator in case of abnormality of said magnetic bearing; and a control circuit controlling said magnetic bearing in accordance with detection signals from said plurality of position sensors, said control circuit vibrating said rotator to be in contact with said protection bearing by reduction in a gain during initial operation and adjusting a position where said rotator is supported by said corresponding magnetic bearing in accordance with outputs from said plurality of position sensors at the time.

2. The initial adjustment circuit of the magnetic bearing apparatus according to claim 1, wherein said control circuit reduces the gain to obtain an intermediate value of the vibration by using maximum and minimum values of the outputs from the sensors when an offset value of the output from each of said plurality of position sensors is maximum, and further to obtain a difference between the intermediate value of the vibration and 0V of the output from each of said plurality of position sensors for adding or subtracting the difference to or from the output from the corresponding position sensor.

3. The initial adjustment circuit of the magnetic bearing apparatus according to claim 2, wherein said addition or said subtraction is repeated several times.

4. The initial adjustment circuit of the magnetic bearing apparatus according to claim 1, wherein said magnetic bearing includes a thrust magnetic bearing for supporting said rotator in a thrust direction, and a radial magnetic bearing for supporting said rotator in a radial direction.

5. The initial adjustment circuit of the magnetic bearing apparatus according to claim 1, wherein said plurality of position sensors include a thrust position sensor for detecting displacement of said rotator in a thrust direction, and a radial position sensor for detecting displacement of said rotator in a radial direction.

6. The initial adjustment circuit of the magnetic bearing apparatus according to claim 1, further comprising a motor for rotating said rotator.

7. The initial adjustment circuit of the magnetic bearing apparatus according to claim 1, wherein said protection bearing is provided on one and the other sides of said rotator.

8. An initial adjustment method of a magnetic bearing apparatus provided with a magnetic bearing body including a plurality of position sensors detecting a position of a rotator, a magnetic bearing provided corresponding to each of said plurality of position sensors for supporting an axis of said rotator in a magnetically non-contact manner, and a protection bearing for supporting said rotator in case of abnormality of said magnetic bearing, said method comprising the step of controlling said magnetic bearing in accordance with detection signals from said plurality of position sensors and vibrating said rotator to be in contact with said protection bearing by reduction in a gain during initial operation for adjusting a position where said rotator is supported by the corresponding magnetic bearing in accordance with outputs from said plurality of position sensors at the time.

9. The initial adjustment method of the magnetic bearing apparatus according to claim 8, wherein said step includes the step of reducing the gain to obtain an intermediate value of the vibration by using maximum and minimum values of the outputs from the sensors when an offset value of the output from each of said plurality of position sensors is maximum, and further to obtain a difference between the intermediate value of the vibration and 0V of the output from each of said plurality of position sensors for adding or subtracting the difference to or from the output from the corresponding position sensor.

* * * * *